Nov. 19, 1968 W. E. W. JACOB 3,412,208

DEVICE FOR CHARGING A CAPACITOR

Filed Sept. 13, 1965 3 Sheets-Sheet 1

INVENTOR
WALTER EMIL WILHELM JACOB
BY
Hane and Nydick
ATTORNEYS

Nov. 19, 1968 W. E. W. JACOB 3,412,208

DEVICE FOR CHARGING A CAPACITOR

Filed Sept. 13, 1965 3 Sheets-Sheet 2

INVENTOR
WALTER EMIL WILHELM JACOB
BY Hane and Nydick
ATTORNEYS

INVENTOR
WALTER EMIL WILHELM JACOB
BY Hane and Nydick
ATTORNEYS

United States Patent Office 3,412,208

Patented Nov. 19, 1968

3,412,208

DEVICE FOR CHARGING A CAPACITOR

Walter Emil Wilhelm Jacob, Hagersten, Sweden, assignor to Telefonaktiebolaget L M Ericsson, Stockholm, Sweden, a corporation of Sweden Continuation-in-part of application Ser. No. 12,302, Mar. 2, 1960. This application Sept. 13, 1965, Ser. No. 486,673

Claims priority, application Sweden, Mar. 31, 1959, 3,024/59

8 Claims. (Cl. 179—15)

ABSTRACT OF THE DISCLOSURE

There is disclosed, by way of example in a telephone system, a circuit for periodically recharging to the same reference voltage level a capacitor which is periodically discharged to different voltage levels. The circuit includes an inductor and resistor serially connected to the capacitor. A switching means periodically connects a source of the reference voltage to the inductor and resistor to form a closed-loop series circuit which includes the capacitor, resistor, inductor and reference voltage source. The values of the inductor, capacitor and resistor are chosen so that the closed-loop series circuit is less-than-critically-damped series resonant circuit whereby the capacitor is always recharged to a voltage level substantially equal to the reference voltage level.

The present invention relates to connecting apparatus for recharging a capacitor from an arbitrary voltage level to a reference voltage level during a given time interval and is a continuation-in-part of my co-pending application Ser. No. 12,302 filed Mar. 2, 1960 now abandoned and entitled, "Connecting Device for Recharging a Capacitance from an Arbitrary Voltage to a Reference Voltage."

There are instances in which it is required to recharge a capacitor to a given voltage level. For example, in electronic telephone systems which work according to the time division multiplex principle, such capacitors are employed. A typical example of a time division multiplex telephone system is described on page 10 of the Ericsson Review, No. 1, 1956. In such an electronic telephone system each of the subscribers is connected to a common transmission pair via a switch. The switch which belongs to a particular connection is periodically closed during a preassigned period which has been allotted to the connection in question, so that information signals from the subscriber are fed over the common transmission pair in mutually displaced time slots as modulated pulse trains. Between each subscriber and his associated switch there are connected a low pass filter and an inductor. The inductor and the terminating capacitor of the filter form an oscillatory circuit. The parameters of the inductor and the capacitor are so chosen that a half cycle of oscillation occurs during the time that the switch is closed. During the time that a subscriber switch is opened, the capacitor of the low pass filter is recharged via said filter to a voltage which is proportional to the instantaneous amplitude of the information or speech signal. Consider now two subscriber stations and their associated switches. When both of the switches, one for each of the subscriber stations, are closed, the subscriber stations are connected together and a current path is established between their associated capacitors. Bearing in mind that each of the subscriber stations has its own oscillatory circuit having the same frequency of oscillation, it should be apparent that during a half period of the resonant oscillating frequency the charges on the capacitors interchange places; that is, the charge on the capacitor associated with one of the subscriber stations is transferred to the capacitor of the other subscriber station and the charge on said other subscriber station is transferred to the capacitor of the first subscriber station. During the time while the switches are open, charges leak off each of the capacitors through its associated low pass filter to the actual subscriber device in the form of speech current.

In order to provide for the transmission of control signals, such as busy signals, in a time division multiplex system, there is a signal circuit having an oscillatory circuit which also includes an inductor and a capacitor. Since the control signal circuit services a plurality of subscribers, it cannot include a low pass filter, since its capacitor must be recharged in the period between successive activations of the switches associated with connecting the subscribers to the main transmission channel. Therefore, recharging of the control signal circuit capacitor occurs directly from a voltage source in the pauses between the pulses which control the activation of the subscriber switches. In the same manner as previously described, the charge on the capacitor of the control signal circuit is exchanged with the charge on the capacitors of the subscriber stations. However, it should be noted that each of the subscriber capacitors will normally be at a different voltage. Therefore, in any exchange of charge between the control signal circuit and the subscriber circuit capacitors, it should be apparent that the capacitor of the control signal circuit ends up with a different charge. Therefore, each time when the capacitor of the control signal circuit must be recharged, it will most likely be recharged from a different voltage level. Consider now the situation in which the control signal circuit and a first subscriber station circuit interchange the charges on their associated capacitors. As a result of this interchange, the capacitor of the control signal circuit will have a given charge and be charged to a given voltage level associated with the voltage level of the charge on the capacitor of the first subscriber station circuit. The capacitor of the control signal circuit is now recharged to a reference voltage level. However, the final recharging voltage level will be a function of the exchange charge that had been on the capacitor. Therefore, in the next time slot when the control signal circuit interchanges charge with the succeeding subscriber station circuit, the charge delivered to the succeeding subscriber station's capacitor will partially represent the amplitude of the signal voltage, that is, the voltage that the capacitor was to be recharged to, and partially the voltage that the capacitor of the first subscriber station's circuit was charged to. Therefore, it should be apparent that cross talk can be introduced between subscribers.

It is, therefore, a general object of the invention to provide an improved circuit for recharging a capacitor to a given voltage level in a given period of time, irrespective of the initial voltage level of the capacitor.

It is another object of the invention to minimize the cross talk that may occur in time division multiplex telephone systems employing signal circuits which exchange charge with capacitors in subscriber stations.

Briefly, the invention contemplates a circuit for periodically recharging to the same reference voltage level a capacitor which is periodically discharged to different voltage levels. The circuit includes an inductor, a resistor and a source of reference voltage. There is provided circuit means including a periodically opening and closing switching means for periodically connecting the capacitor, the inductor, the resistor and the source of reference voltage to form a closed-loop series circuit so that the capacitor is always recharged to a voltage level substantially equal to the reference voltage level.

More specifically, the inductance of the inductor, the capacitance of the capacitor, and the resistance of the resistor are so chosen that the closed-loop series circuit is a less than critically damped series resonant circuit which has a resonant period substantially equal to the time that the switching means connects the reference voltage in series with the remainder of the series circuit.

Other objects, features and advantages of the invention will be apparent from the following detailed description when read with the drawings, which show, by way of example and not by way of limitation, apparatus for practicing the invention.

Figure 1:
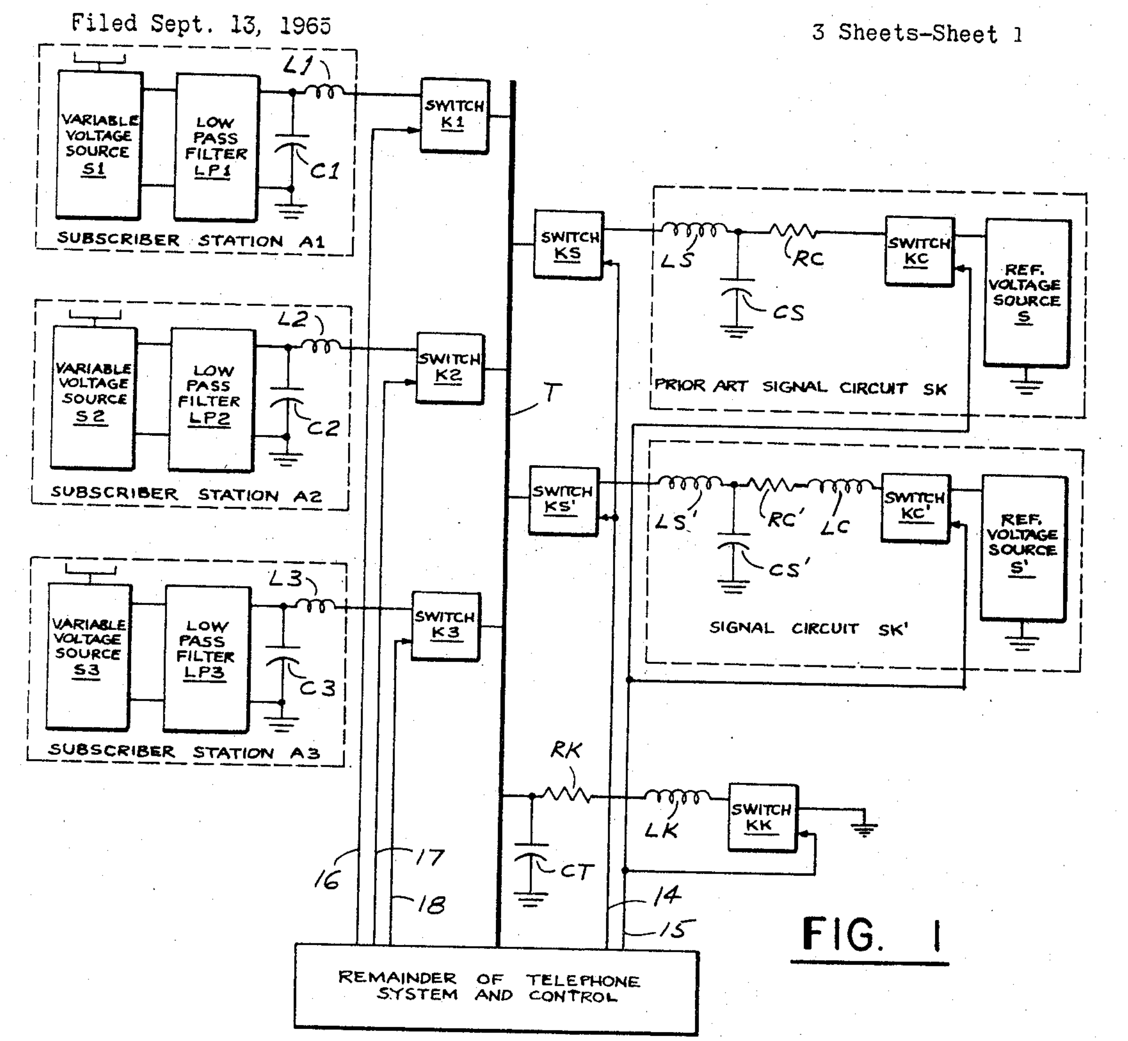
FIG. 1 shows pertinent portions of an electronic telephone system which includes the recharging circuit in accordance with the invention.

Referring now to FIG. 1, there is shown a small electronic telephone switchboard which employs time division multiplexing. The switchboard includes three subscriber stations A1, A2 and A3. The subscriber stations are connected respectively by switches K1, K2 and K3 to a common transmission channel T which is connected to the remainder of the telephone system. There is also connected to the common transmission channel a control signal circuit which generates, for example, busy signals. While the system shows two signal circuits SK and SK′, it should be realized that the signal circuit SK is the normally employed prior art signal circuit, whereas the signal circuit SK′ is a signal circuit in accordance with the invention. Therefore, the actual system will include only one of these signal circuits, and preferably the signal circuit SK′. In any event, the signal circuit SK is connected to the common transmission channel T by the switch KS, and the signal circuit SK′ is connected to channel T via the switch KS′.

In order to control the sequential operation of the switches according to a particular program, there is provided in the remainder of the telephone system a switch sequence control. The switch sequence control can take one of many forms which are well known, and for the sake of simplicity is not shown or described.

The various elements of FIG. 1 will now be further described. A typical subscriber station A1 includes a variable voltage source S1 which can be, for example, a telephone hand set. The output of variable voltage source S1 is connected to low pass filter LP1, whose output element is capacitor C1. Capacitor C1 is connected via inductance L1 to the information input of switch K1. The remaining subscriber stations A2 and A3 are similarly constructed. Switch K1 can be, for example, a transistor switch wherein the emitter and collector thereof form a circuit between inductor L1 and transmission channel T. The base of the transistor (the control input) is connected to the switch sequence control via the line 16. Normally, the switch K1 is open. However, when the signal on line 16 is, say, positive, the switch is closed and a connection is completed between the subscriber station A1 and the common transmission channel T. Although the switch K1 has been described as a simple transistor switch, it should be apparent that other types of switches can be employed. Switches K2 and K3, which respectively connect subscriber station A2 and subscriber station A3 to the common transmission channel T under control of the signals on lines 17 and 18, are similarly constructed.

The signal circuit SK and the signal circuit SK′ are in many respects similar to each other. In particular, the signal circuit SK includes a reference voltage source S which is a low frequency signal source. The frequency is so low with respect to the switching times associated with the switches K1, K2, K3, etc. that for all practical purposes it can be considered a direct current source. Reference voltage source S is connected to switch KC, which is similar to the previously described switch K1. The output of switch KC is connected to resistor RC. Capacitor CS is connected between resistor RC and ground. The junction of resistor RC and capacitor CS is connected via inductance LS to the input of switch KS. The output of switch KS is connected to common transmission line T. Switch KS is similar to the previously described switches. It should be noted that switch KC is normally open and closes when, say, a positive signal is present on line 15. Similarly, switch KS is open and closes when a positive signal is present on line 14.

Signal circuit SK′ is similar to the previously described signal circuit SK; therefore, primed reference characters will be used. In particular, the difference between the two circuits is that an inductor LC is connected between the output of switch KC′ and resistor RC′.

In order to simplify the explanation of the invention, the function of a typical time division multiplex telephone system will be briefly described. First, it should be realized that the switches such as K1 to K3 are periodically opened and closed. Assume that a conversation is to take place between subscriber station A1 and subscriber station A2. During a period of time which corresponds to one-half the period associated with the cut-off frequency of the low pass filters LP, voice signal charge is applied to the associated capacitors. For example, while the switch K1 is open, a voice signal voltage is transmitted from variable voltage source S1 via low pass filter LP1 to develop a charge across capacitor C1. At the same time, assuming switch K2 is open, variable voltage source S2 transmits a voice signal voltage pia low pass filter LP2 to capacitor C2. Accordingly, capacitors C1 and C2 are charged in accordance with the amplitude of their associated voice signal voltages. Now, assume that switches K1 and K2 simultaneously close. There is now established a resonant circuit which includes capacitor C1, inductor L1, common transmission channel T, inductor L2 and capacitor C2. This circuit oscillates, and in a half cycle of operation the charge on capacitor C1 is transferred to capacitor C2 and the charge on capacitor C2 is transferred to capacitor C1. Then switches K1 and K2 open. Capacitor C1 leaks its charge via low pass filter LP1 back to the variable voltage sources S1 to provide speech current to the hand set of subscriber station A1. Similarly, for the subscriber station A2. In other words, speech impulses are transferred between the subscriber stations. This type of interchange occurs periodically with a frequency of about eight thousand repetitions a second adequately to handle ordinary speech. The shortest time during which the switches can be closed for transmission of information voice signals during each period and, in accordance with that time, the number of channels in a multiplex ssytem, are determined by the quality of the switches, and in particular, their ability to handle a maximum current.

In order to transmit signals, such as busy signals, to any one of the subscriber stations, heretofore there has been provided a signal circuit SK. Whenever the switch KS, connected to signal circuit SK, is closed, there is formed an oscillatory circuit comprising the capacitor CS, the inductor LS, and for example, the inductor L1 and the capacitor C1 of subscriber station A1. Accordingly, the charge on capacitor CS is transferred to capacitor C1, and the charge on capacitor C1 is transferred to capacitor CS. Since the charge on capacitor C1 results from the instantaneous amplitude of the reference voltage source S, it is seen that in this way the busy signal is transferred to the subscriber station A1 in the same manner as the interchange of information speech signals between connected subscriber stations. Since the signal circuit SK must be in a position to transmit a busy signal to each one of the subscriber stations, there is a limited period of time during which its associated capacitor CS can be recharged, following an interchange of charge. Therefore, a low pass filter such as is used in the subscriber stations cannot be employed.

Figure 2:
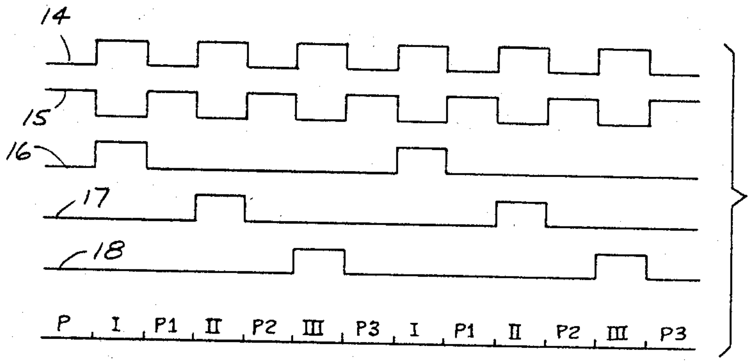
FIG. 2 shows a timing diagram to explain the sequence of operation of the switches of FIG. 1.

With respect to the operation of the subscriber stations and the signal circuits there will now be described the operation of the switches employed therein. The control transmits two phases of square wave over lines 14 and 15. The waveforms of these square waves are shown as curves 14 and 15 in FIG. 2. In synchronism with the square wave signal on line 14, control transmits signals on lines 16, 17 and 18. Output 16 transmits a positive pulse once every three cycles of square wave. Similarly, for outputs connected to lines 17 and 18. See FIG. 2 for the phasing of the signals on lines 16, 17 and 18. Now, assuming that the switches close only when a positive voltage is present on their associated control inputs, it will be apparent that switches KC and KS operate once per cycle of square wave, but operate out of phase with each other. Similarly, switches K1, K2 and K3 operate sequentially, and their operation is displaced by one period of square wave. Furthermore, when switch K1 is closed, switch KS is also closed. Similarly, when switch K2 is closed, switch KS is closed, and when switch K3 is closed, switch KS is also closed. Furthermore, it should be apparent that the charge on capacitor CS is transferred to one of the capacitors of the subscriber stations for each cycle of square wave. And, therefore, the charge on capacitor CS must be recharged for each cycle of square wave. Thus if a busy signal must be sent to successive subscriber stations, there is a charge on capacitor CS to transmit the busy signal.

The signal circuit SK of the prior art has several drawbacks especially concerned with the possibility of cross talk between two channels. Assume that each of the subscriber stations A1, A2 and A3 must receive a busy signal at the same time. Therefore, referring to the waveforms of FIG. 2 and thesystem of FIG. 1, it is seen that during interval I both switch K1 and switch KS are closed. Therefore, there is an interchange of charge between capacitors C1 and CS. During interval P1 switches K1 and KS open, but switch KC closes. Accordingly, capacitor CS is recharged to the amplitude of the reference voltage, that is, busy signaal voltage, from the reference voltage source S. During interval II switch KS and switch K2 close, and there is an interchange of charge between capacitors C2 and CS. During interval P2 switches K2 and KS open and switch KC closes, causing recharging of capacitor CS, etc.

Figure 3:
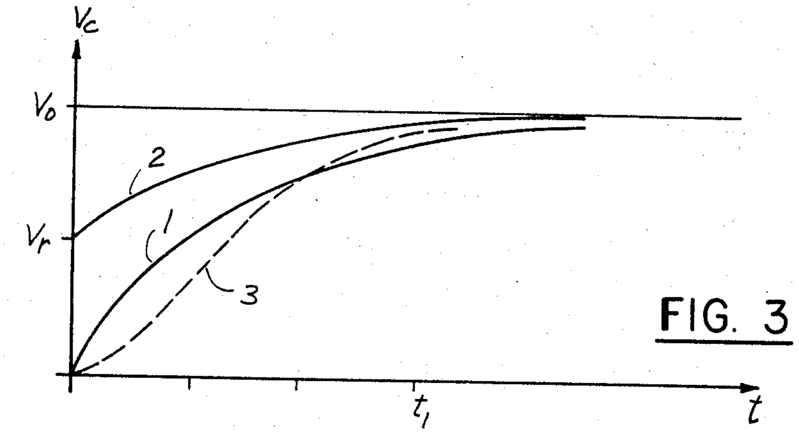
FIGS. 3 and 4 are waveforms of the voltage across the capacitor as a function of time for different types of capacitor recharge.

It should now be apparent that there is inherent resistance in the recharging circuit of capacitor CS; that is, the circuit that includes reference voltage source S, switch KC, resistor RC and the ground return. Therefore, in any finite period of time, capacitor CS cannot fully recharge to the output voltage $V_0$ of reference voltage source S. In fact, if the time constant of the circuit is equal to about one-third the period of time during which switch KC is closed, the recharge voltage across capacitor CS will equal only about 95% of the voltage $V_0$ if capacitor CS was initially uncharged. Such a charging curve is shown in FIG. 3, wherein the point $t1$ on the time axis indicates the time that the switch KC is closed. Capacitor CS will have zero charge, provided the capacitor with which it exchanged charge had no charge. For example, if subscriber station A1 is connected to signal circuit SK and there are not speech signals at subscriber station A1, then capacitor C1 will have no charge and, during the interchange of charge between capacitors C1 and CS, capacitor CS will receive no charge. Therefore, during the period of time up to $t1$ capacitor CS will recharge according to curve 1 of FIG. 3. However, if subscriber station A1 has voice signals thereon, then, after the charge interchange, capacitor CS will have a charge. Assume this charge is equivalent in amplitude to the level $V_r$ shown in FIG. 3. Therefore, during the recharge of capacitor CS the voltage developed across the capacitor CS will follow curve 2 of FIG. 3. Therefore, at time $t1$ the voltage across capacitor CS will be greater than the voltage thereacross if there had been initially no charge on capacitor CS. Now, during interval II, when signal circuit SK is connected to subscriber station A2, it is seen that the interchange of charge between capacitor CS and capacitor C2 results in capacitor C2 receiving a voltage having two components. One component is related to the amplitude of the initial reference voltage, whereas the second component is related to the charge on capacitor C1 during the previous interchange. In this way, cross talk between the different subscriber stations can arise. In other words, the signal voltage across capacitor CS is superimposed with a voltage which is a function of the speech voltage across capacitor C1 in the earlier pulse position. Therefore, when the time constant of the recharging circuit equals one-third of the period of time during which switch KC is closed, the voltage across capacitor CS will include a component which is equal to about 5% of the voltage across the capacitor of the previous subscriber station. This results in a cross talk attenuation of only three nepers. Generally, the cross talk attenuation will equal 5/RXC nepers, where $t$ is the recharging time and RXC is the time constant of the recharge circuit. In telephone systems, it is required that the cross talk attenuation equal 7.5 nepers. In order to satisfy this criterion, it is necessary that the time constant RXC equal $t/7.5$. Because of the limits imposed on the recharge time and the value of the recharge capacitor (capacitor XCS) by virtue of the remainder of the system, the recharge resistance is so low that it is virtually impossible to provide a switch KC to satisfy the demands. In particular, the recharging current waveform, curve 6 of FIG. 5, for a pure RC discharge is at a maximum the instant the switch is closed. Such a current flow is deleterious to transistor type switches. This type of switch does not attain its lowest impedance instantaneously.

Figure 4:
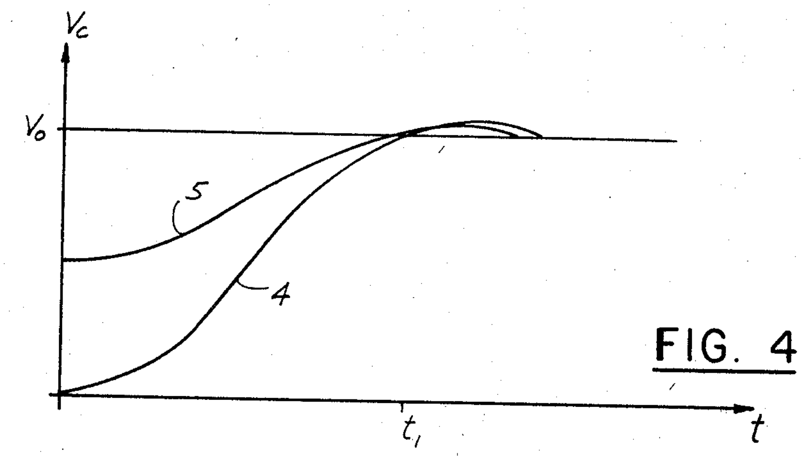

In order to remove these limitations, a signal circuit SK′ in accordance with the invention is provided. The difference between the signal circuit SK′ and the signal circuit SK is the inclusion of the inductor LC in the charging circuit. The inductor LC has an inductance which is so chosen with respect to the resistance of the resistor RC and the capacitance of the capacitor CS as to provide a less than critically damped oscillatory circuit. In other words, the capacitor CS′, the resistor RC′ and the inductor LC form a series resonant circuit which is tuned slightly below critical damping. When this is done, the recharing of capacitor CS′ very closely approaches the reference voltage $V_0$, irrespective of the charge on the capacitor CS′ at the start of the recharge period. For example, FIG. 4 shows curve 4 which represents the recharging of capacitor CS′ to the voltage $V_0$ from an initial uncharged state, and the curve 5 shows the recharging of the capacitor CS′ from the state in which it had a voltage developed across it equal to a considerable value. In either case, the charging reaches the value $V_0$ at time $t_1$. In other words, at time $t_1$ the capacitor reaches the same reference voltage, irrespective of its previous charge. Therefore, no cross talk can be generated. For the sake of comparison, there is shown in FIG. 3 a curve 3 which represents a recharging voltage for a critically damped circuit. It is seen that even for a critically damped circuit the recharging voltage is not reached within the time interval $t_1$.

Figure 5:
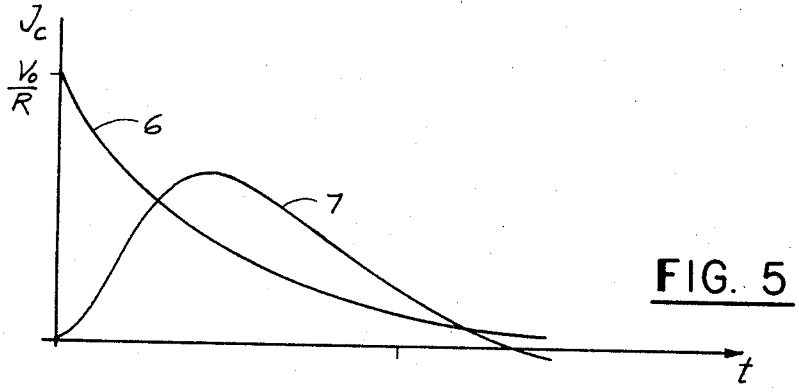
FIG. 5 is a waveform of the recharged current for different types of capacitor recharge.

A further advantage is accrued in that the actual recharging current has a much more ideal waveform, as shown by the curve 7 of FIG. 5. In this case the initial current rises from zero to a maximum and then tapers off. Such a current flow is ideal for switches of the semiconductor type. It should be noted, however, that when the recharge time ends, there is still a considerable current flow. This current flow implies that magnetic energy is stored in inductor LC. This energy must be removed during the time between recharges in order to prevent cross talk. The dissipation of the magnetic energy takes place in the form of a damped oscillation which has a high frequency in comparison with the natural frequency of the circuit comprising inductor LS' and capacitor CS'. This freqeuncy is determined by the inductance of inductor LC and the stray capacitance of that inductor. This oscillation can be damped through the aid of a resistance connected in parallel with the inductor LC. It is possible to wind the inductor LC with resistance wire. Since a whole pulse time is available before the next recharge interval, there is sufficient time to dissipate the energy in the magnetic field.

The following equation can be used to determine the parameters for a less than critically damped circuit:

$$t=\frac{R\cdot C}{2\sqrt{a-1}}\cdot(\pi-\arctan\sqrt{a-1}) \qquad (1)$$

where $t$ is the time for recharging of the capacitor, C is the capacitance of the capacitor being recharged, R is the resistance in the recharging circuit, and $$a=\frac{L}{L_{kr}}$$

L equals the inductance in the recharging circuit, and $$L_{kr}=\frac{R^2C}{4}$$

which is the inductance of the recharging circuit for critical damping. Therefore, the only two parameters to be determined are the value of the resistance R in the recharging circuit and the value of the inductance L of the inductor in this circuit. Accordingly, the recharging resistance R and the recharging inductance L are functions of $a$. By selecting a given time $t=t_p$ and a known recharging capacitance $C=C_s$, it is possible to determine the required resistance $R_c$ and the inductance $L_c$ as functions of $a$. In particular, $$R_c=\frac{t_p}{C_s}\cdot\frac{2\sqrt{a-1}}{a(\pi-\arctan\sqrt{a-1})} \qquad (2)$$

and $$L_c=\frac{a\cdot R_c^2\cdot Cs}{4} \qquad (3)$$

Figure 6:
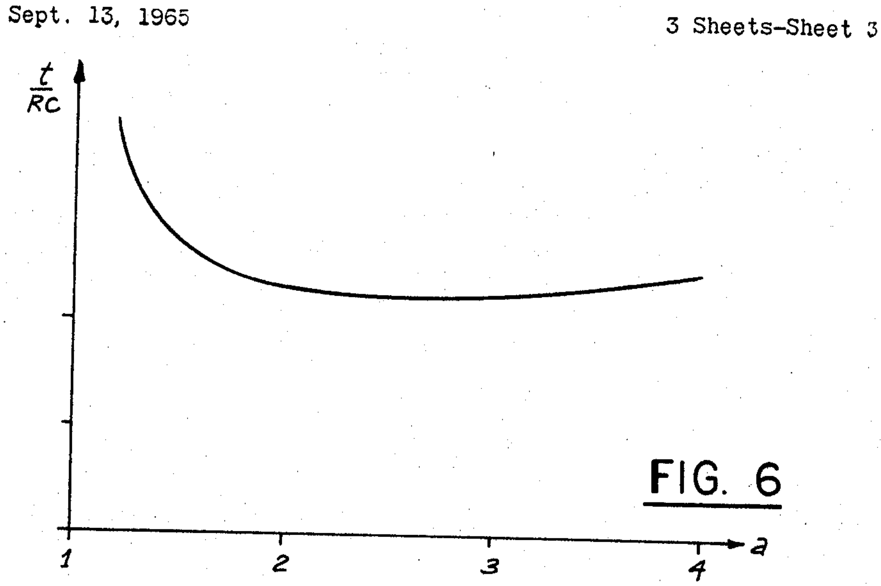
FIG. 6 is a graph which illustrates the method of determining the parameters of the recharge circuit.

FIG. 6 shows Equation 1 in the form of $$\frac{t}{RC}$$

as a function of $a$. The curve shows that the time $t$ at a constant value of RC has a flat minimum for $a$ equal to 2.55. That is, the recharging can occur within the shortest time if the inductance L equals 2.55, $L_{kr}$. For this value, the time of recharge is also quite insensitive to variations of the inductance in the recharge circuit. On the other hand, the current at the zero crossing of the capacitor voltage is rather high. This causes a storage of magnetic energy in the inductor of the recharge circuit. Hence, care must be taken in the selection of the switch. Because of this fact, the inductance of the recharging circuit is chosen so that $a$ value has a value of between 1.1 and 1.5. Of course, this correspondingly increases the recharging time.

Although the discussion up to now has considered the recharging of a capacitor to a voltage having a non-zero magnitude, the principle of the invention can be employed to discharge a capacitor to zero volts. For example, the circuit associated with the capacitor CT connected to the common transmission channel T performs this function. It is necessary to discharge this capacitor to ground between switching from subscriber station to subscriber station so that no charge remains on the capacitor as a result of a previous exchange of charge in the previous time slot. The accumulation of any charge would result in cross talk. Therefore, in order to discharge the capacitor completely there is provided a circuit comprising the resistor RK and the inductor LK coupled via switch KK to ground. Therefore, whenever switch KK is closed, capacitor CT is discharged to ground via the circuit including resistor RK and inductor LK. Of course, in accordance with the invention the circuit parameters of the resistor RK and inductor LK are determined with respect to the capacitance of capacitor CT and the connection time of the switch KK to provide an oscillatory circuit that is less than critically damped. In such a circuit the current flow will have a more favorable waveform, as shown in FIG. 5.

Figure 7:
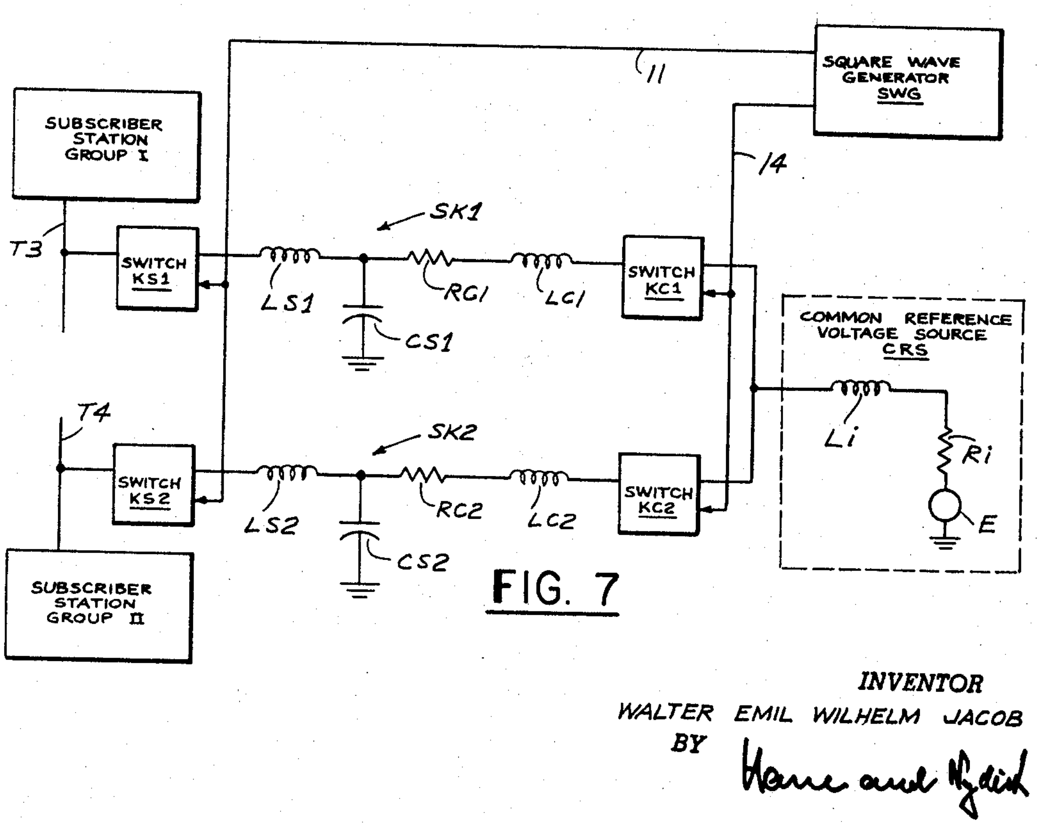
FIG. 7 shows an alternate embodiment of the invention wherein two recharging circuits are fed by a common source.

In small telephone systems, as shown in FIG. 1, there is generally a single signal circuit and a single reference voltage source. However, in larger systems there may be many signal circuits, each serving its own common transmission channel. However, it is desirable to have a single voltage source feeding all of these signal circuits. For example, there are shown in FIG. 7 portions of a telephone system wherein signal circuits SK1 and SK2, respectively, service the subscriber station group I connected to channel T1 and the subscriber station group II connected to channel T2. However, there is a common reference voltage source CRS that feed both of the signal circuits. In such a case, it is necessary to consider the internal resistance of the voltage source and not lump it in with the usual resistance in the recharging circuit. In other words, the influence of the internal resistance $R_i$ of the common voltage source CRS must be taken into consideration. Two possible cases arise. The first case is where the quiescent voltages across the capacitors CS1 and CS2 have the same amplitude but are of opposite sign. In other words, there is a symmetry. In such a case it is easily seen that the internal resistance $R_i$ has no influence on the circuit, because the quiescent voltages do not cause any current to flow through this resistance. Accordingly, the recharging circuits can be calculated in accordance with the Equations 1 to 3. The second case, which is the asymmetrical case, is one in which the quiescent voltages across the capacitors CS1 and CS2 have the same amplitude and also the same sign.

If there are N signal circuits, then the internal resistance $R_i$ can be divided among the different circuits by a simple transformation so that the recharging resistance in each of the circuits will be equal to $R_c+NR_i$. In other words, each instantaneous recharging distribution on the capacitors may be considered to consist of a superposition of two components of charge, one of which is symmetrical according to the symmetrical case given above, and the other asymmetrical according to the asymmetrical case given above. For a given value in the symmetrical case, Equation 3 indicates that an increase in the resistance due to the influence of the internal resistance $R_i$ in the asymmetrical case causes the inductance of the recharging circuit to be increased so that the recharging time remains unaltered. Therefore, in order that this may be accomplished it is necessary to include an inductor $L_i$ in the common branch, as shown in FIG. 7. In order to calculate the parameters for the signal circuits in the case in which there is a common signal source, the value of $a$ is first chosen, and this value should be as low as possible. Then the values of $R_i$ and $L_c$ are determined for the actual recharging time and the value of the capacitance of the capacitor to be recharged with the aid of Equations 2 and 3. After that, the resistance $R_c+NR_i$ is determined. This value is then inserted for the resistance value in Equation 2, and a new value for $a$ is obtained. This is valid for the asymmetrical case. This value $a$ is inserted in Equation 3, from which the value of the inductance is then obtained. A portion of this inductance is already the inductance $L_c$ for the symmetrical case. The remainder of the inductance is the inductance $L_l$ and is equal to $$\frac{L-L_c}{n}$$

An inductor having an inductance equal to $L_l$ is then connected in the common branch.

If it is desired to connect several signal circuits to the same signal source having an internal resistance which is not sufficiently small, a certain limit is soon reached where any increase in the share $NR_l$ for every circuit can no longer be tolerated, due to the fact that there is a maximum value of the resulting resistance for the value of $a$ equal to 2.55. However, the number of active circuits can be reduced by controlling the switches KC with the same program as the switches KS either during the pauses P before or after the closing of the switch KS. This results in the number of connected signal circuits varying at any one time, and the compensation described above no longer works. However, the probability is very small that more than, for example, two subscriber stations in a telephone switchboard will receive a signal in the same time slot, so that it is necessary only to compensate for the cases $N=1$ and $N=2$. Since there are three different possible combinations even for these cases, namely, for the case $N=2$, there must be considered the symmetrical case and the asymmetrical case, and then for the usual case of $N=1$.

Due to the squared relation between the resistance $R_l$ and the inductance $L_l$ (see FIG. 3) on the one hand, and the linear relationship between $R_l$ and $L_l$ and the number of signal circuits on the other hand, there are, however, only two possibilities for compensation; that is, the intersection of the points between a parabola and a straight line. Therefore, the number of possible combinations multiplied by the number of cases must not exceed two. In the last example it is possible, for instance, to choose full compensation for the two latter cases wherein the two circuits are calculated so that the magnitude of the value $a$ will be as near to one as possible for the first case. Due to the low current through the switch KC if $a$ is approximately equal to one, not much care need be taken for the time of operation of the switch.

The above reasoning is, of course, applicable for the case of the simultaneous discharge of several capacitors through a common discharge circuit which has an internal resistance. This case is fully analagous to the above-described situations.

While only several embodiments of the invention have been shown and described in detail, there will now be apparent to those skilled in the art many modifications and variations which satisfy many or all of the objects of the invention but which do not depart from the spirit thereof as defined in the appended claims.

What is claimed is:

1. A circuit combination for periodically recharging to the same reference voltage level a capacitor which is periodically discharged to different voltage levels, said circuit combination comprising an inductor, a resistor, means for serially connecting said inductor, said resistor and said capacitor, a source of reference voltage including output terminals, and switching means for periodically connecting said reference voltage source, via said terminals, in series with said series circuit so that a closed-loop series circuit including said capacitor, said inductor, said resistor and said reference voltage source is periodically formed, the inductance of said inductor, the capacitance of said capacitor and the resistance of said resistor being so chosen that the closed-loop circuit is a less than critically damped series resonant circuit so that said capacitor is always recharged to a voltage level substantially equal to the reference voltage level.

2. A circuit combination for periodically recharging to the same reference voltage level a capacitor which is periodically discharged to different voltage levels, said circuit combination comprising an inductor, a resistor, means for serially connecting said inductor, said resistor and said capacitor, a source of reference voltage including output terminals, and switching means for periodically connecting said reference voltage source, via said terminals, in series with said series circuit so that a closed-loop series circuit including said capacitor, said inductor, said resistor and said reference voltage source is periodically formed, the inductance of said inductor, the capacitance of said capacitor and the resistance of said resistor being so chosen that the closed-loop series circuit is less than critically damped and has a resonant period substantially equal to the time that said switching means connects said reference voltage source in series with said series circuit so that said capacitor is always recharged to a voltage level substantially equal to the reference voltage level.

3. A circuit combination for periodically recharging to the same reference voltage level a capacitor which is periodically discharged to different voltage levels, said circuit combination comprising an inductor, a resistor, means for serially connecting said inductor, said resistor and said capacitor, a source of reference voltage including output terminals, and switching means for periodically connecting said reference voltage source, via said terminals, in series with said series circuit so that a closed-loop series circuit including said capacitor, said inductor, said resistor and said reference voltage source is periodically formed, the resistance R of said resistor being equal to $$\frac{t}{C}\cdot\frac{2\sqrt{a-1}}{a(\pi-\arctan\sqrt{a-1})}$$

the inductance of said inductor being equal to $$\frac{aR^2C}{4}$$

where $t$ is the period of time said source of reference voltage is connected in series with said series circuit, C is the capacitance of said capacitor and $a$ is a numerical constant having a value in the range of 1.1 to 1.5, so that said capacitor is always recharged to a voltage level substantially equal to said reference voltage level at the end of each recharging period, irrespective of the voltage level across said capacitor at the state of each recharging period.

4. In a telephone system, in combination: a common transmission channel; at least one subscriber station comprising a source of varying voltage, a filter circuit including a first capacitor connected to said source so that the instantaneous voltage of said source is developed across said first capacitor, a first inductor connected to said first capacitor, and first circuit means including a first periodically operating switching means for periodically serially connecting said first capacitor and said first inductor to said common transmission channel; and a common signaling means comprising a second capacitor, a second inductor connected to said second capacitor, and second circuit means including a second periodically operating switching means for periodically serially connecting said second inductor and said second capacitor to said common transmission channel, a third inductor, a resistor, a source of reference voltage, and third circuit means, including a third periodically operating switching means, for periodically connecting said second capacitor, said third inductor, said resistor and said source of reference voltage to form a series circuit.

5. A telephone system according to claim 4, wherein the inductance of said third inductor, the capacitance of said second capacitor and the resistance of said resistor are so chosen that said series circuit is a less than critically damped series resonant circuit.

6. The telephone system of claim 4, further comprising a third capacitor including a first terminal connected to said common transmission channel and a grounded second terminal, and means for periodically discharging said third capacitor to ground, said last-named means comprising a second resistor, a fourth inductor and a periodically operating circuit-opening and closing means connected in series between the first terminal of said third capacitor and said grounded second terminal.

7. A circuit combination for periodically recharging to the same reference voltage level a capacitor which is periodically discharged to different voltage levels, said circuit combination comprising an inductor, a resistor, a source of reference voltage, and circuit means including a periodically opening and closing switching means for periodically connecting said capacitor, said inductor, said resistor and said source of reference voltage to form a closed-loop series circuit, the inductance of said inductor, the capacitance of said capacitor and the resistance of said resistor being so chosen that the closed-loop series circuit is a less than critically damped series resonant circuit so that said capacitor is always recharged to a voltage level substantially equal to the reference voltage level.

8. A circuit combination for recharging to the same reference voltage level first and second capacitors, each of which is periodically discharged to different voltage levels, comprising: a first resistor and a first inductor, means for connecting said first resistor and said first inductor in series with said first capacitor to form a first series circuit; a second resistor and a second inductor, means for connecting said second resistor and said second inductor in series with said second capacitor to form a second series circuit; a reference voltage source including a reference voltage generator, a third inductor and a third resistor connected in series, a first periodically operating switching means for periodically connecting said reference voltage source to said first series circuit, and a second periodically operating switching means for periodically connecting said reference voltage source to said second series circuit.

References Cited

UNITED STATES PATENTS 2,837,698 6/1958 Segall ---------- 320—1 X

FOREIGN PATENTS 841,555 7/1960 Great Britain.

ROBERT L. GRIFFIN, *Primary Examiner.*

W. S. FROMMER, *Assistant Examiner.*